United States Patent [19]
Caughman, Jr.

[11] Patent Number: 5,681,460
[45] Date of Patent: Oct. 28, 1997

[54] SELECTIVELY REMOVABLE SLUDGE FILTRATION SYSTEM AND METHOD

[76] Inventor: Carl Russell Caughman, Jr., 707 Lehman, Houston, Tex. 77018

[21] Appl. No.: 533,399

[22] Filed: Sep. 25, 1995

[51] Int. Cl.⁶ .................................................. B01D 29/15
[52] U.S. Cl. ...................... 210/232; 210/416.1; 210/483; 210/486; 210/499
[58] Field of Search ....................... 210/232, 299, 210/416.1, 433.1, 483, 486, 499

[56] References Cited

U.S. PATENT DOCUMENTS

| | | |
|---|---|---|
| 301,460 | 8/1884 | Russell . |
| 569,382 | 10/1896 | Knight ........................... 210/486 |
| 741,402 | 10/1903 | Holderman ..................... 210/486 |
| 988,391 | 4/1911 | Shillington . |
| 1,793,080 | 2/1931 | Glover ........................ 210/433.1 |
| 3,115,822 | 12/1963 | Votten ........................ 210/433.1 |
| 3,446,357 | 5/1969 | Gomella ....................... 210/195 |
| 4,116,838 | 9/1978 | Lazzarotto ................... 210/486 |
| 4,253,955 | 3/1981 | Kline ........................... 210/172 |
| 4,805,525 | 2/1989 | Bivens ........................... 99/408 |
| 4,871,454 | 10/1989 | Lott ............................. 210/205 |
| 4,968,423 | 11/1990 | McKale et al. ................ 210/486 |
| 5,069,784 | 12/1991 | Taniguchi et al. ............. 210/433.1 |

*Primary Examiner*—Christopher Upton
*Attorney, Agent, or Firm*—Kneeling Law Firm

[57] ABSTRACT

A selectively removable sludge filtration system that provides for retrofit into a container and separation of the sludge solids from the sludge liquids therein. A pair of spaced vertically oriented filter assemblies each define a filtrate cavity therein and are connected by separator plates. The filter assemblies permit the flow of sludge liquids into the filtrate cavity, but not sludge solids. A set of fasteners hold the filter assemblies in the container and bias the filter assemblies against the container bottom. The fasteners may be released to provide for removal of the sludge filtration system from the container. A fluid communication passageway directs filtrate from the filtrate cavity to a position exterior of the container. Functionally applying this sludge filtration system provides a method of retrofitting a container with a sludge filtration system and removing filtrate from a sludge in the container.

11 Claims, 2 Drawing Sheets

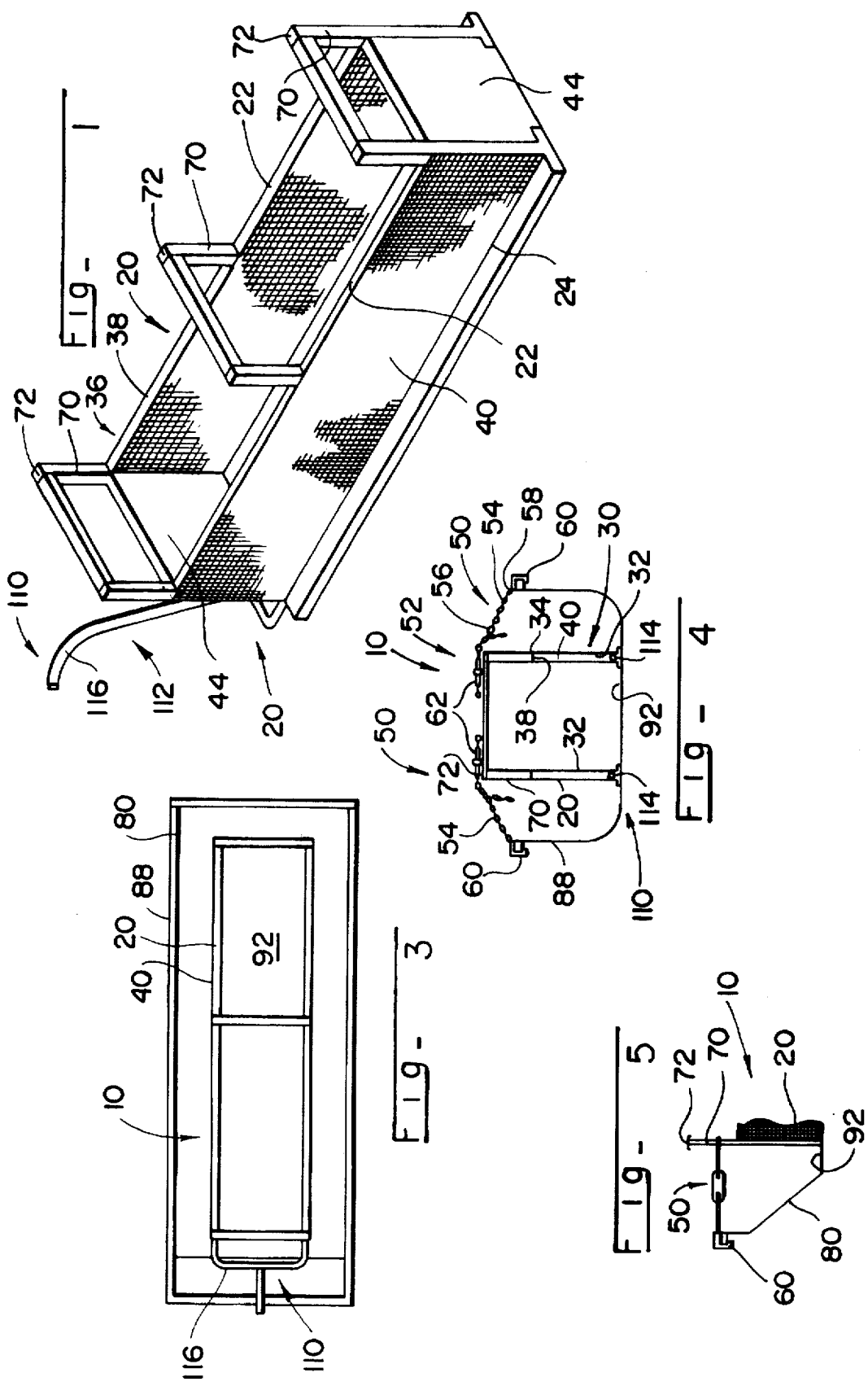

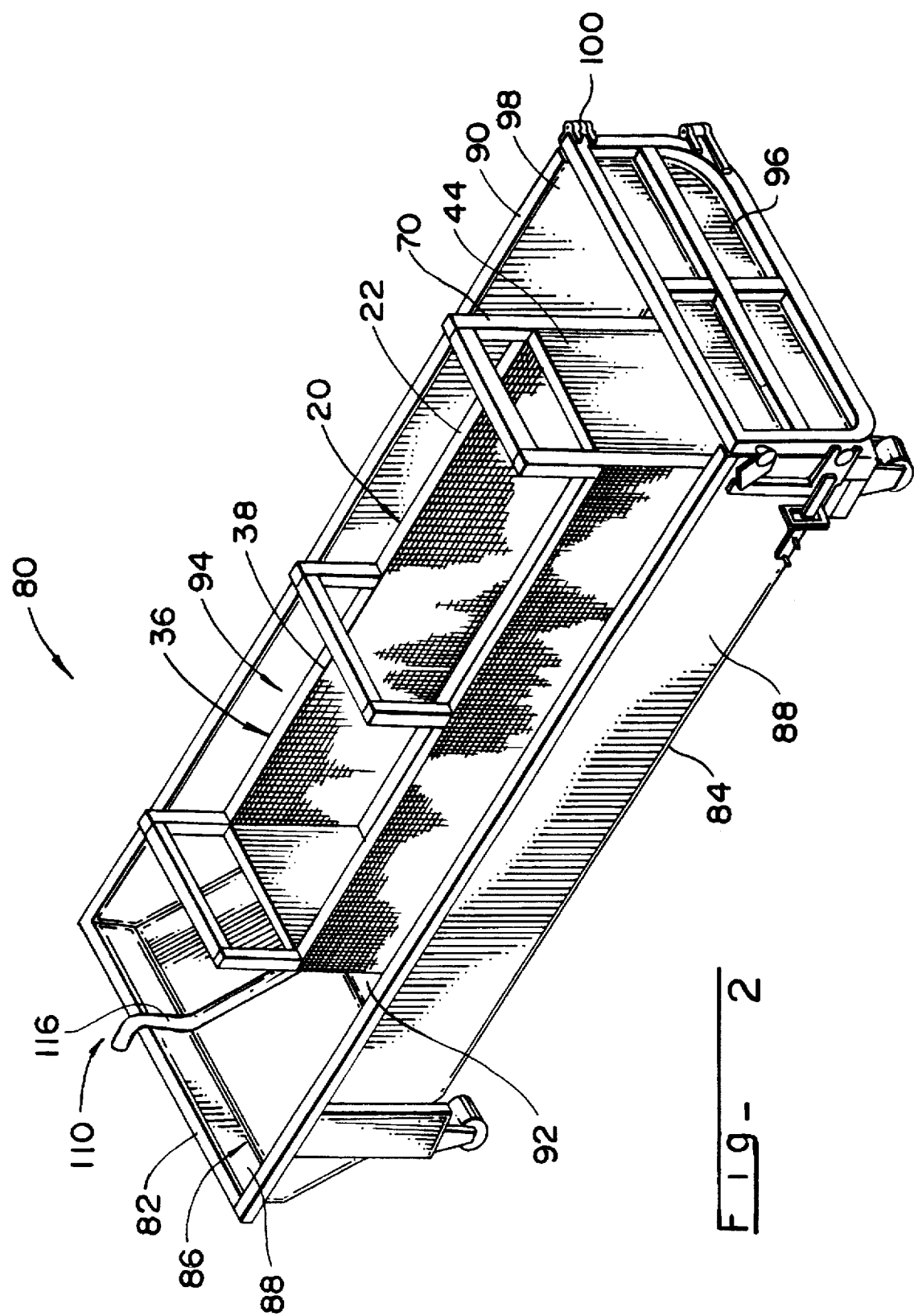

5,681,460

SELECTIVELY REMOVABLE SLUDGE FILTRATION SYSTEM AND METHOD

BACKGROUND OF THE INVENTION

1. Field of Invention

This invention relates to a filtering apparatus and method. More specifically, it is directed to a filtration system that is constructed for selective retrofitting into a container for extracting liquid from a sludge or slurry and separating the resulting liquids and solids for separate disposal or recovery.

Sludge includes any solid-liquid sludge and slurry such as sewage and industrial waste. The sludge may contain any ratio of liquids to solids. In fact, the sludge often has substantially more solid material than liquid material. Separation of the sludge into its liquid and solid components, also known as "dewatering," is desirable for recovery or disposal of the one or both of the components.

One typical manner of dewatering sludge involves placing the sludge into a container that has filters therein. The liquid in the sludge passes through the filters and from the container. However, the filters do not permit the solids to pass therethrough. Therefore, the solids remain in the container and are removed after the dewatering operation is complete.

Generally, vacuum drainage enhances the dewatering operation by drawing the liquids from the sludge through the filter. Vacuum drainage requires the use of a pump in flow communication with the filtrate cavity of the filter. In order to utilize a pump that can develop a vacuum, the filtrate cavity must remain below the liquid surface level at all times.

A number of containers, however, do not contain the filters needed for filtering the sludge because they are designed for more general purposes. Consequently, sludge dewatering generally requires special containers fitted with the needed filters. This need for specially designed dewatering containers causes waste of container resources.

2. Related Art

Filtering systems have long been known to the prior art. Illustrative of such systems are U.S. Pat. No. 301,460, U.S. Pat. No. 988,391, U.S. Pat. No. 3,446,357, and U.S. Pat. No. 4,253,955.

Though the above mentioned filtering systems may be helpful for their stated purposes, they do not address the problem of retrofitting a general purpose container with the filters necessary for sludge dewatering.

SUMMARY OF THE INVENTION

Accordingly, the objectives of this invention are to provide, inter alia, a selectively removable sludge filtration system and method that:

provides for fast, efficient filtration and dewatering of sludge;

provides for vacuum drainage of the sludge liquid;

provides for maximum filter surface area;

may be removably placed in and removed from a container; and includes connectors that maintain the filter in the container when the container is tilted for sludge solid removal.

Other objects of the invention will become apparent from time to time throughout the specification and claims as hereinafter related.

To achieve such improvements, my invention is a selectively removable sludge filtration system and method for separating sludge solids and sludge liquids. The sludge filtration system includes at least one filter assembly that defines at least one filtrate cavity therein. An attachment means provides for selective attachment of the filter assembly in a container. The attachment means may maintain the filter assembly in the container, even when the container is tilted for sludge solid removal. A filtrate removal means provides for the evacuation of filtrate from the filtrate cavity. In this way, the filter assembly may be selectively inserted into or removed from a general purpose container and provide sludge filtration therein. Functionally applying this apparatus provides a method of retrofitting a general purpose container for sludge dewatering.

BRIEF DESCRIPTION OF THE DRAWING

The manner in which these objectives and other desirable characteristics can be obtained is explained in the following description and attached drawings in which:

FIG. 1 is an isometric view of the sludge filtration system.

FIG. 2 is a side elevational view of the sludge filtration system positioned within a container.

FIG. 3 is a top elevational view of the sludge filtration system positioned within a container.

FIG. 4 is a sectional view taken along lines 4—4 in FIG. 3 showing the filtrate cavity.

FIG. 5 is a sectional view taken along lines 5—5 in FIG. 3 showing the connection of the filter assembly to the front end of the container.

DETAILED DESCRIPTION OF THE INVENTION

The preferred embodiment of my invention is illustrated in FIGS. 1 through 5 and the selectively removable sludge filtration system is depicted as 10.

Generally, sludge includes, inter alia, any solid-liquid sludge and slurry such as sewage and industrial waste. As indicated, the sludge contains sludge solids and sludge liquids. In treating the sludge, it is desirable to separate the sludge liquids from the sludge solids for recovery or disposal of the individual components. The sludge filtration system 10 provides for and facilitates the desired component separation.

Basically, the sludge filtration system 10 comprises at least one filter assembly 20, at least one attachment means 50, and at least one filtrate removal means 110. The sludge filtration system 10 construction permits selective placement and removal of the sludge filtration system 10 in a container 80 to provide sludge filtration therein.

The container 80 is constructed to receive and maintain the sludge therein. Generally, the container 80 comprises a container bottom 92 at the container bottom end 84 and container side walls 88 extending upwardly from the perimeter of the container bottom 92 to form a basin. The container bottom 92 and the container side walls 88 define a container cavity 94 therebetween. The container bottom 92 and container side walls 88 are sealingly connected to prevent the escape of sludge liquid from the container cavity 94.

To facilitate receipt of sludge into the container 80, the container top end 82 includes a container top opening 86 constructed to receive sludge therethrough. The container top opening 86 may simply comprise an open container top end 82 wherein the container has no cover and the container opening 86 is defined by the upper edges of the container side walls 88. Alternatively, in a container 80 having a cover, the container opening 86 may comprise an opening through the cover.

The construction of the container 80 facilitates removal of dewatered sludge therefrom. In a first embodiment, one of the container side walls 88, the gate container side wall 96, rotatably connects to an adjacent side wall, the support container side wall 98, by a hinge 100. Alternatively, the gate container side wall 96 rotatably connects to both adjacent side walls by a hinge 100. In both embodiments, the gate container side wall 96 may selectively rotate to an open position and, thereby, provide a container side opening. With the gate side wall 96 in the open position, the dewatered sludge is more easily removed through the container side opening. In the closed position, however, the gate container side wall 96 sealing mates with the container bottom 92 and the adjacent container side walls 88 to prevent the escape of sludge from the container 80.

A second preferable construction feature of the container 80 that promotes easy removal of the dewatered sludge therefrom is the tilt design. This tilt design may include any known hinged container 80 design or container 80 lifting design. Thus, the sludge filtration system 10 must attach to the container 80 in such a way as remain in the container 80 during a container 80 tilt position.

In general, the filter assembly 20 comprises a rigid filter support 30 constructed to permit the flow of filtrate therethrough. Disposed upon and attached to the filter support 30, a filter media 40 filters the sludge liquid from the sludge solid. The filter media 40 porosity permits the flow of sludge liquids therethrough but prevents the flow of sludge solids therethrough. The sludge liquid that passes through the filter media 40, the filtrate, flows into the filtrate cavity 42 defined by the filter assembly 20.

Preferably, the rigid filter support 30 is a pair of substantially parallel side walls 32 held in spaced proximal relation by a connecting means 36. To provide the required rigidity and permeability, the side walls 32 are made of perforated plate. To maintain the substantially flat side walls 32 in proper position, the connecting means 36 comprises a substantially continuous and rigid connecting plate 38 that extends substantially about the perimeter 34 of the side walls 32. The side walls 32 each have a greater relative surface area than the connecting plate 38 sides. In this way, the connecting means 36, attaches the perimeter 34 of one of the side walls 32 to the perimeter 34 of the other side wall 32. Thus, the side walls 32 and connecting plate 38 form a box-like structure having two perforated walls 32. The walls, 32 and 38, of this box-like structure define the filtrate cavity 42 therebetween.

To maximize the surface area in contact with the sludge, the filter assembly 20 is preferably positioned with the side walls 32 vertically oriented. Additionally, the sludge filtration system 10 preferably includes two filter assemblies 20 maintained in spaced parallel relation by at least one filter assembly support plate 44.

The attachment means 50 is for selectively attaching the filter assembly 20 in a container 80. Because the container 80 may tilt for sludge removal, the attachment means 50 must maintain the filter assembly 20 in the container 80 when in such position. Consequently, the attachment means 50 preferably comprises a biasing means 52 for selectively applying and maintaining a downward force on the filter assembly 20. The downward force presses the filter assembly lower end 24 against the container bottom 92. When this force is sufficient, the friction between the filter assembly 20 and the container bottom 92 prevents the filter assembly 20 from sliding during a container 80 tilt condition. Adding a connection between the filter assembly 20 and the container side wall 88 that is distal the gate container side wall 96, as shown in FIG. 5, enhances the attachment means 50 during tilt conditions.

In order to maintain a vacuum in the filtrate cavity 42 and, thereby, enhance the dewatering operation, the filter assembly 20 must remain below the sludge level. Therefore, the filter assembly 20 is preferably constructed to be maintained below the sludge when the filter assembly 20 is positioned in a container 80 that has sludge therein. Thereby, the filter assembly 20 construction facilitates maintenance of a differential pressure that is lower than the atmospheric pressure in the filtrate cavity 42. Consequently, the filter top end 22 must remain below the level of the sludge and, thus, below the container wall top end 90.

Because of this height requirement of the filter assembly 20 and because of the preferred downward biasing of the attachment means 50, the attachment means 50 preferably includes an extension member 70 that extends upward from the filter top end 22. When the filter assembly 20 is positioned in a container 80, the extension member upper end 72 reaches above the container top 82.

Generally, the preferred biasing means 52 includes a fastener 54, a clamping means 60, and a tightening means 62. The fastener 54 has a fastener first end 56, a fastener second end 58, and a length. The fastener first end 56 connects to the upper end 72 of the extension 70. A clamping means 60 at the fastener second end 58 enables selective connection of the fastener second end 58 to the container wall top end 90. A tightening means 62 for pulling the fastener second end 58 toward the upper end 72 of the extension member 70 provides the downward biasing of the biasing means 52. The length of the fastener may be either a predetermined, substantially constant length or an adjustable length. Either length design may aid in tightening and biasing the biasing means 52.

The filtrate removal means 110 provides for evacuation of the filtrate from the filtrate cavity 42. Generally, the filtrate removal means 110 is a fluid communication passageway 112 that extends from a filter assembly lower end 24 to a position exterior of a container 80 when the filter assembly 20 is in a container 80. Typically the fluid communication passageway 112 includes a port 114, or opening, through a wall, 32 or 38, and a flexible hose 116 in flow communication with the port 114.

A pump means in flow communication with the fluid communication passageway 112 produces the desired differential pressure that is lower than the atmospheric pressure within the filtrate cavity and evacuates filtrate from the filtrate cavity 42. The pump means is any type of liquid pump that can maintain a vacuum when sealed from the atmosphere and that is capable of operating under dry condition, but is preferably a peristaltic pump or diaphragm pump.

Functionally applying the above described sludge filtration system 10 provides a method of retrofitting a container 80 with a sludge filtration system 10 and removing filtrate from a sludge in the container 80.

I claim:

1. A sludge filtration system, comprising:
   a transportable, tiltable container;
   said container including container side walls and a container bottom defining a container cavity;
   at least one filter assembly defining at least one filtrate cavity;
   said filter assembly selectively receivable in said container cavity;

at least one attachment means for selectively attaching said at least one filter assembly in said container;

at least one filtrate removal means for evacuating filtrate from said at least one filtrate cavity;

said at least one filtrate removal means functioning independently and separately from said container;

said at least one attachment means including an extension member at a filter top end of said at least one filter assembly;

said extension member at a top of said container when said at least one filter assembly is positioned in a container;

said at least one attachment means including biasing means, said biasing means functionally engaging at least one top end of a container wall and an upper end of said extension member;

said biasing means selectively applying and maintaining a lateral and a downward force on said filter assembly, thereby retaining said filter assembly in a fixed lateral position in relation to said container walls and with a filter assembly bottom surface juxtaposed against said container bottom;

whereby said attachment means, when engaged, maintaining said at least one filter assembly in a fixed position relative to said container when said container is in a normal, upright position and when said container is in a tilted position; and whereby said at least one filter assembly is selectively inserted into or removed from said container cavity to provide for sludge filtration therein.

2. A sludge filtration system as claimed in claim 1 wherein said at least one filter assembly comprises:

a rigid filter support, said support including perforations which permit the flow of filtrate therethrough;

a filter media disposed on and attached to said filter support;

said filter media permitting the flow of filtrate therethrough; and said filter media preventing the flow of sludge solids therethrough.

3. A sludge filtration system as claimed in claim 2 wherein said rigid filter support comprises:

a pair of substantially parallel side walls;

said side walls comprising perforated plates;

a substantially continuous and rigid connecting plate extending substantially about a perimeter of said side walls; and thereby connecting said perimeter of one of said side walls to said perimeter of the other of said side walls.

4. A sludge filtration system as claimed in claim 3 wherein said biasing means comprises:

a fastener having a fastener first end, a fastener second end, and a predetermined, substantially constant length;

said fastener first end connected to said upper end of said extension member;

clamping means for selectively connecting said fastener second end to a container wall top end; and tightening means for pulling said fastener second end toward said upper end of said extension member.

5. A sludge filtration system as claimed in claim 3 wherein said biasing means comprises:

a fastener having a fastener first end, a fastener second end, and an adjustable length;

said fastener first end connected to said upper end of said extension member;

clamping means for selectively connecting said fastener second end to a container wall top end; and tightening means for pulling said fastener second end toward said upper end of said extension member.

6. A sludge filtration system as claimed in claim 3 wherein said at least one filtrate removal means comprises a fluid communication passageway extending from a lower end of said at least one filter assembly to a position exterior of said container when said at least one filter assembly is positioned in a container.

7. A sludge filtration system as claimed in claim 6 wherein said fluid communication passageway includes:

a port extending through a wall of said at least one filter assembly; and a flexible hose in flow communication with said port.

8. A sludge filtration system as claimed in claim 7 wherein said at least one filtrate removal means includes:

pump means for creating a differential pressure that is lower than the atmospheric pressure in said filtrate cavity and for evacuating filtrate from said filtrate cavity; and said pump means in flow communication with said hose.

9. A sludge filtration system as claimed in claim 8 wherein said pump means comprises a pump that can maintain a vacuum when sealed from the atmosphere and that is capable of operating under a dry condition.

10. A sludge filtration system as claimed in claim 3 comprising:

two filter assemblies:

at least one filter assembly support plate; and said filter assembly support plate maintaining said filter assemblies in spaced parallel relation.

11. A sludge filtration system comprising:

a transportable tiltable container;

said container including container side walls and a container bottom defining a container cavity;

two filter assemblies each defining a filtrate cavity;

said two filter assemblies selectively receivable in said container cavity;

a plurality of filter assembly support plates extending between said two filter assemblies;

said plurality of filter assembly support plates maintaining said filter assemblies in spaced parallel relation;

each of said filter assemblies having a pair of substantially parallel side walls;

said side walls comprising perforated plates thereby permitting the flow of filtrate therethrough;

each of said filtering assemblies having a substantially continuous and rigid connecting plate extending substantially about a perimeter of said side walls; and thereby connecting said perimeter of one of said side walls to said perimeter of the other of said side walls;

each of said filter assemblies also having a filter media disposed on and attached to said side walls;

said filter media permitting the flow of filtrate therethrough;

said filter media preventing the flow of sludge solids therethrough;

at least one extension member at a filter top end of said filter assemblies;

said at least one extension member at a top of said container when said at least one filter assembly is positioned in a container;

a fastener having a fastener first end and a fastener second end;

said fastener first end connected to an upper end of said extension member;

clamping means for selectively connecting said fastener second end to a wall top end of said container;

tightening means for pulling said fastener second end toward said upper end of said extension member;

said fastener, clamping means, and tightening means thereby applying and maintaining a lateral and a downward force on said filter assembly, thereby retaining said filter assembly in a fixed lateral position in relation to said container walls and with a filter assembly bottom surface juxtaposed against said container bottom;

whereby said fastener, clamping means, and tightening means, when engaged, maintaining said at least one filter assembly in a fixed position relative to said container when said container is in a normal, upright position and when said container is in a tilted position;

at least one fluid communication passageway extending from a lower end of said filter assemblies to a position exterior of said container when said at least one filter assembly is positioned in a container;

said at least one fluid communication passageway functioning independently and separately from said container;

pump means for creating a differential pressure that is lower than the atmospheric pressure in said filtrate cavity and for evacuating filtrate from said filtrate cavity;

said pump means in flow communication with said fluid communication passageway; and whereby said filter assemblies is selectively inserted into or removed from said container to provide for sludge filtration therein.

\* \* \* \* \*